(12) United States Patent
Karlbauer et al.

(10) Patent No.: US 7,165,783 B2
(45) Date of Patent: Jan. 23, 2007

(54) AIRBAG FOR A PASSENGER PROTECTION DEVICE

(75) Inventors: Ulrich Karlbauer, Ulm (DE); Martin Breuninger, Neu-Ulm (DE); Christian Weyrich, Neu-Ulm (DE)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/202,924

(22) Filed: Aug. 10, 2005

(65) Prior Publication Data

US 2006/0033314 A1 Feb. 16, 2006

Related U.S. Application Data

(63) Continuation of application No. PCT/DE04/00131, filed on Jan. 23, 2004.

(30) Foreign Application Priority Data

Feb. 10, 2003 (DE) ................ 103 06 343

(51) Int. Cl.
*B60R 21/16* (2006.01)
(52) U.S. Cl. .................... 280/730.2; 280/749
(58) Field of Classification Search ............ 280/730.2, 280/749
See application file for complete search history.

(56) References Cited

U.S. PATENT DOCUMENTS

| | | | |
|---|---|---|---|
| 5,588,672 A | 12/1996 | Karlow et al. | |
| 6,158,767 A | 12/2000 | Sinnhuber | |
| 6,176,513 B1 | 1/2001 | Neidert | |
| 6,273,458 B1 | 8/2001 | Steffens, Jr. et al. | |
| 6,375,216 B1 | 4/2002 | Eschbach | |
| 6,454,296 B1 * | 9/2002 | Tesch et al. | 280/730.2 |
| 6,464,250 B1 | 10/2002 | Faigle et al. | |
| 6,494,486 B2 | 12/2002 | Pausch et al. | |
| 6,666,475 B2 | 12/2003 | Kippschull | |
| 6,676,154 B2 | 1/2004 | Fischer | |
| 6,848,708 B2 * | 2/2005 | Green et al. | 280/729 |
| 6,945,556 B2 * | 9/2005 | Maertens | 280/729 |
| 2002/0024204 A1 | 2/2002 | Fischer | |
| 2002/0167153 A1 | 11/2002 | Kippschull | |
| 2003/0116946 A1 | 6/2003 | Roos | |

FOREIGN PATENT DOCUMENTS

| | | |
|---|---|---|
| DE | 196 54 490 A1 | 6/1998 |
| DE | 100 21 577 A1 | 11/2000 |
| DE | 297 24 502 U1 | 10/2001 |
| DE | 100 22 078 A1 | 11/2001 |
| DE | 101 29 581 A1 | 2/2002 |
| DE | 101 40 982 A1 | 3/2002 |
| DE | 101 26 322 A1 | 4/2002 |
| DE | 101 22 838 A1 | 12/2002 |
| EP | 0 814 001 A1 | 12/1997 |
| GB | 2 327 066 A | 1/1999 |
| GB | 2 374 053 A | 10/2002 |
| WO | WO 03/059700 A1 | 7/2003 |

* cited by examiner

*Primary Examiner*—Eric Culbreth
(74) *Attorney, Agent, or Firm*—Foley & Lardner LLP

(57) ABSTRACT

An airbag for a passenger protection device affords optimum protection to a passenger while being produced using only a small amount of material and, therefore, in an economical manner. This is achieved by providing the airbag with at least two partial airbags that are fluidically connected to each other. At least one tensioning device draws the at least two partial airbags towards each other, thereby tensioning them together.

19 Claims, 4 Drawing Sheets

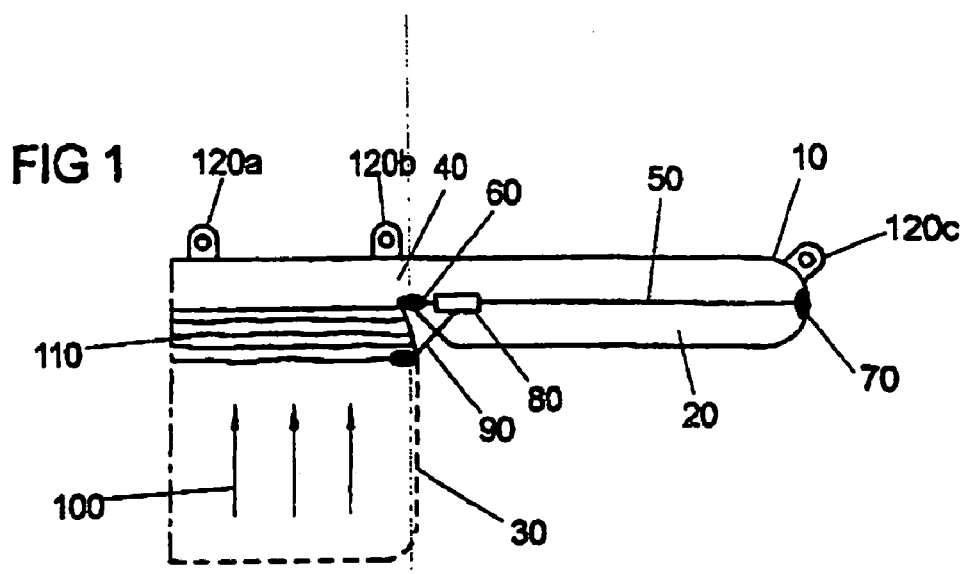
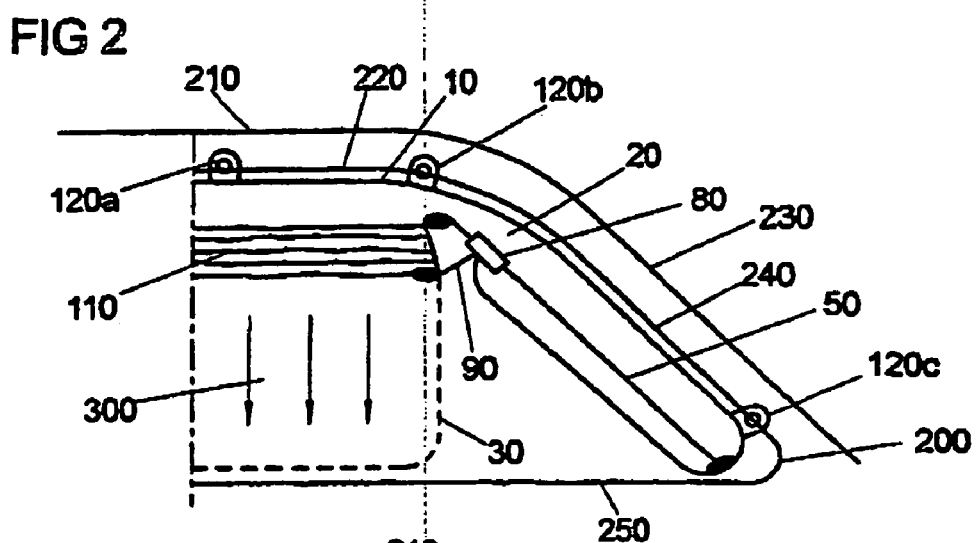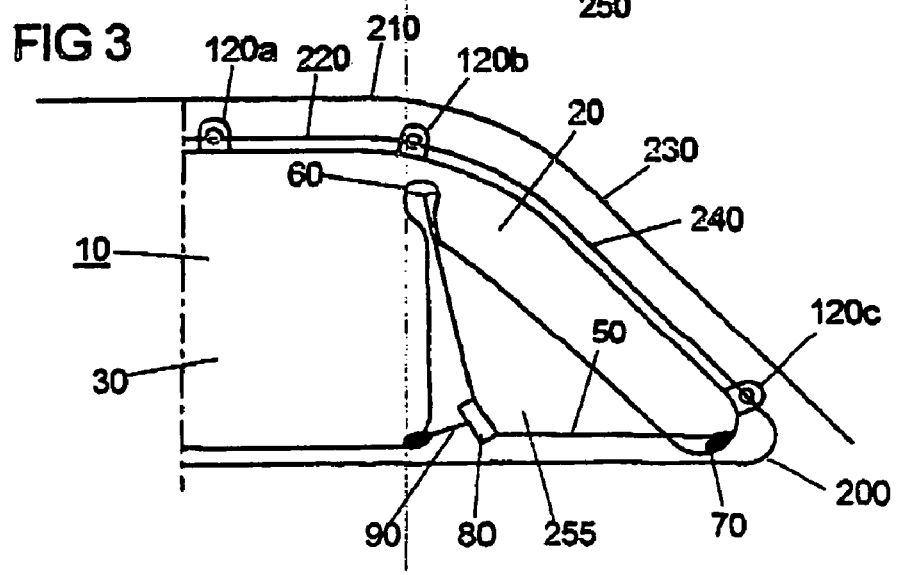

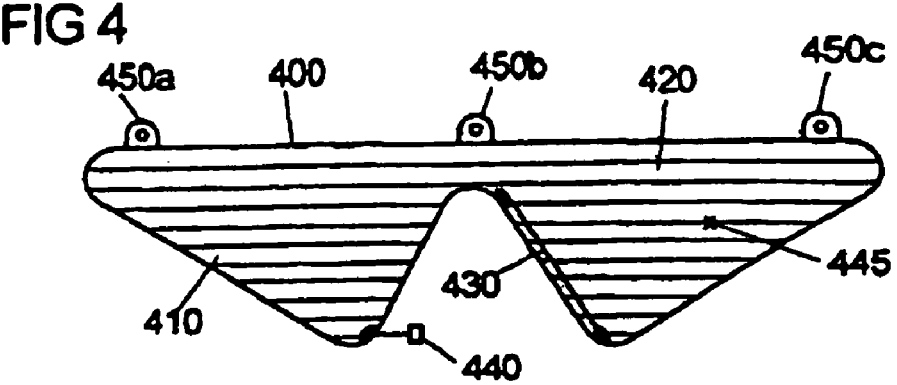
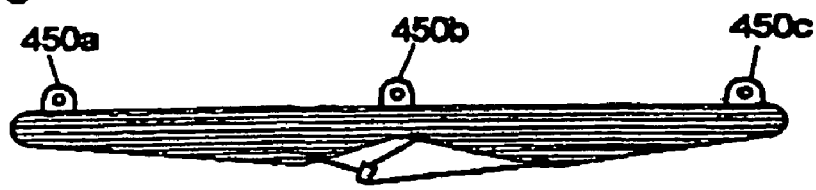
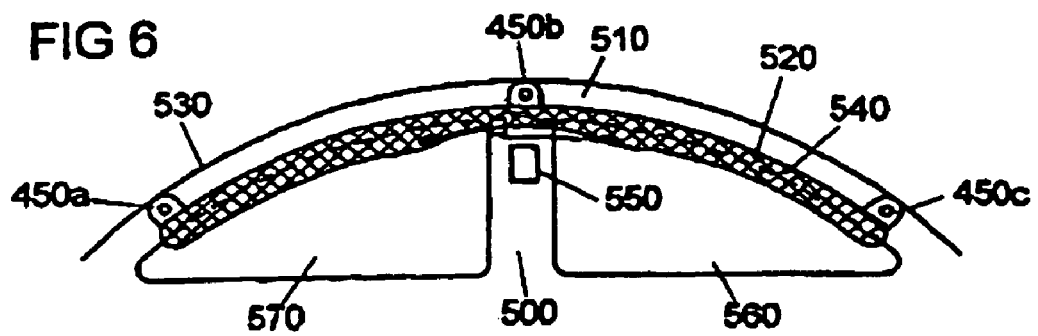
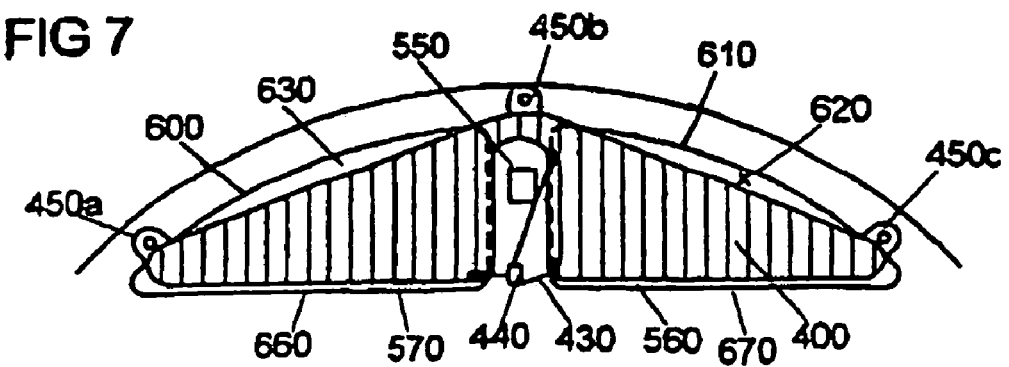

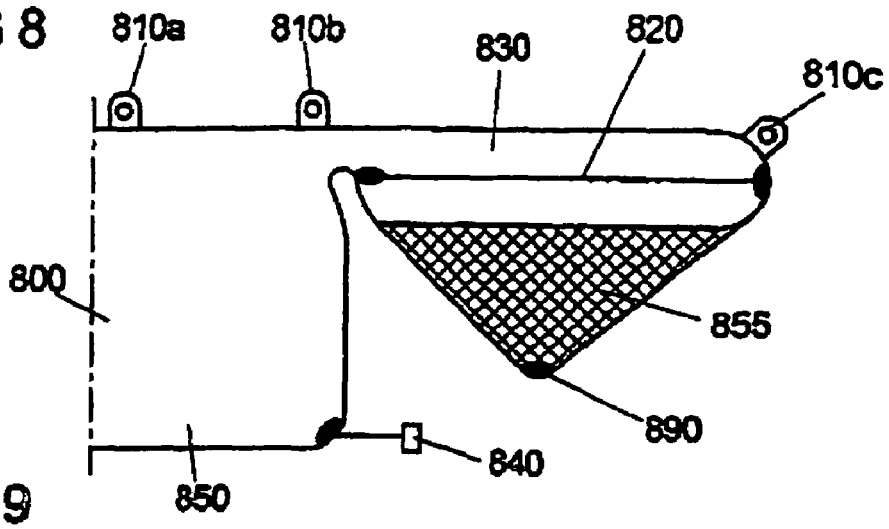
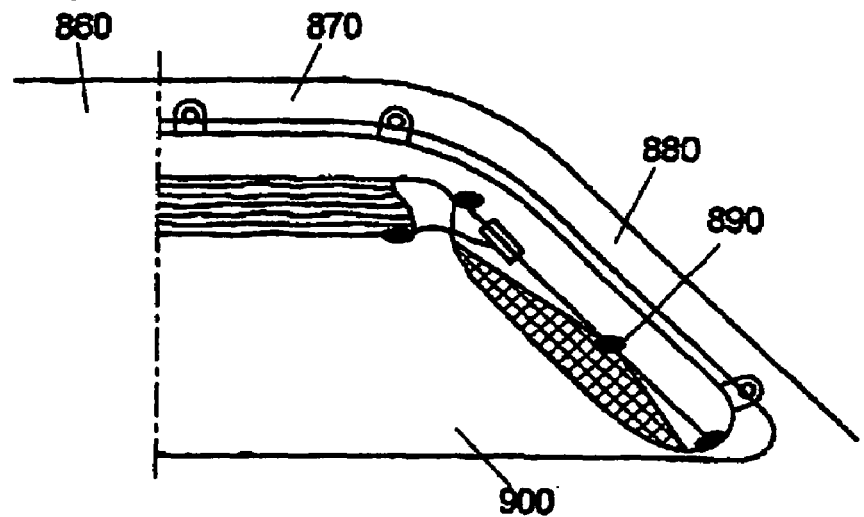
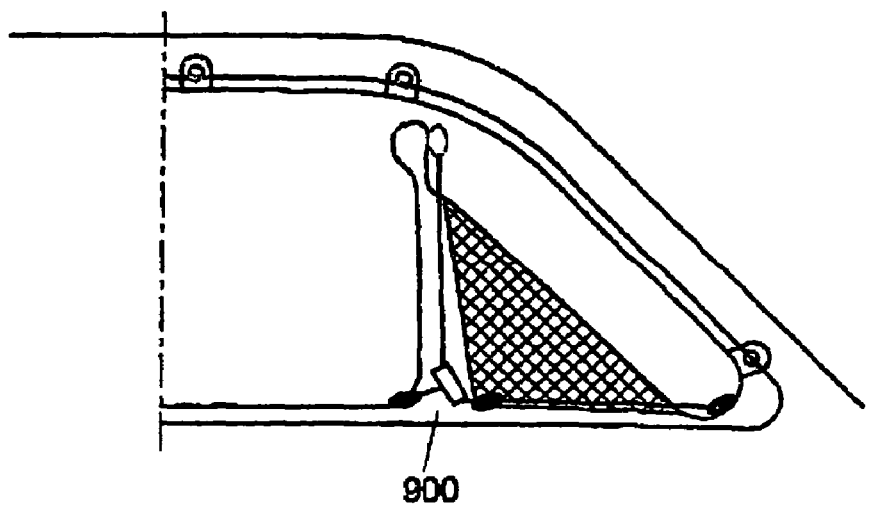

AIRBAG FOR A PASSENGER PROTECTION DEVICE

CROSS REFERENCE TO RELATED APPLICATIONS

This application is a continuation of International Application PCT/DE/2004/000131, which has an international filing date of Jan. 23, 2004, and published in German as WO 2004/069609 (incorporated by reference herein in its entirety).

BACKGROUND

The present invention relates to an airbag for a passenger protection device. In particular, the present invention relates to airbags for passenger protection devices in motor vehicles.

Passenger protection devices with airbags have been used in motor vehicles for years. It is also known to fasten airbags to the vehicle body by means of intercepting straps to achieve a predetermined positioning of the airbags relative to the passenger's body (e.g., DE 101 29 581 A1, DE 101 26 322, DE 100 21 577, each of which is incorporated herein in its entirety).

An object of the present invention is to provide an airbag for a passenger protection device that affords optimum protection for a vehicle passenger while being produced with the smallest possible outlay of material, thereby enhancing cost-efficiency.

SUMMARY

An embodiment of the present invention addresses an airbag for a passenger protection device. The airbag includes, among other possible things: (a) at least two partial airbags that are connected to each other in terms of airflow; and (b) at least one tensioning device that is configured to pull the at least two partial airbags toward each other and to secure the at least two partial airbags to each other.

In a further embodiment, the tensioning device may have a tensioning cable. Further, a first end of the cable may be fastened to the airbag in a connecting region between the two partial airbags. Further still, a second end of the cable may be fastened to an end, which is away from the connecting region, of a first of the two partial airbags. The second of the two partial airbags may be indirectly or directly connected to the tensioning cable.

In another further embodiment, the second partial airbag may have a guide through which the tensioning cable is pulled. Further, the guide may be formed by a gastight opening in the second partial airbag. Additionally or alternatively, the guide may be formed by a loop that is fastened to the second partial airbag.

In another further embodiment, the airbag may be a head side airbag.

In another further embodiment, the first partial airbag may be fastened in a region between front and rear vehicle pillars. Further, the second partial airbag may be fastened in a region of a roof strut of the motor vehicle.

In another further embodiment, the partial airbags may be configured such that, when inflated, the first partial airbag extends along the front or rear vehicle pillar and the second partial airbag extends essentially vertically downward from the roof strut.

In another further embodiment, the airbag may have at least three partial airbags, of which a primary may be fastened in the region of the front vehicle pillar, a secondary may be fastened in the region of the roof strut, and a tertiary may be fastened in the region of the rear vehicle pillar.

In another further embodiment, there may be two tensioning devices. A first of the two tensioning devices may be provided in a front motor vehicle region and may secure the primary and secondary partial airbags to each other. A second of the two tensioning devices may secure the secondary and tertiary partial airbags to each other.

In another further embodiment, the tensioning device may be provided in a central region of the airbag.

In another further embodiment, the central region of the airbag may be arranged in a region of a central vehicle pillar of the motor vehicle.

In another further embodiment, the tensioning device may be arranged in the region of an upper belt deflection of the motor vehicle.

In another further embodiment, each of the at least one tensioning device may be arranged at a point of the airbag at which a protection potential does not have to be provided.

In another further embodiment, the airbag may have a fabric sail in a region of each of the at least one tensioning device.

In another further embodiment, wherein each fabric sail may cover an opening in the region of the airbag that is formed by the associated tensioning device.

In another further embodiment, each fabric sail may be essentially triangular.

In another further embodiment, each fabric sail may be anchored by an associated tensioning device.

In another further embodiment, the airbag may have a plurality of fabric sails.

In another further embodiment, each window may have a lower edge. Further, the airbag may have at least one supporting element on at least one of the window lower edges. Further still, each of the at least one supporting element may be configured to prevent the airbag from being deflected into regions of associated side windows in the event of an accident.

In another further embodiment, window cords of the side windows of the motor vehicle may remain partially open in the event of the accident.

A substantial advantage of the airbag according to the invention is to be seen in the fact that it can be used, with a minimum requirement of material, even in "problem zones" of the motor vehicle. This advantage will now be explained using the example of an airbag that is intended to cover a front side window and, therefore, the region of the front vehicle pillar (A-pillar) of the motor vehicle. The details below are, of course, correspondingly also valid for the rear vehicle pillar (C-pillar or D-pillar) and the rear side windows.

In the region of the A-pillar, there is basically the problem that the curved upper window cord, i.e., the entire upper edge of the window that includes the top window edge and the front window side edge, is longer than the associated window lower edge. If, in order to protect a vehicle passenger, the airbag is to cover the entire window pane, the lower edge of the airbag could consequently be shorter than the upper edge of the airbag, which is fastened to the upper roof strut and the A-pillar. However, reducing the material of the airbag is not possible because the airbag cannot then be folded into its accommodating region (i.e., the airbag module or accommodating container or tube) that is situated in the region of the roof pillar and the front A-pillar; this is because the lower edge of the airbag is simply too short.

As a result of the foregoing, to be able to fold the conventional airbag into the accommodating region, a single-part airbag with an accommodating region arranged on the roof strut and the A-pillar has to be cut with an excessive amount of material on the lower edge of the airbag. In other words, in the case of a conventional single-part airbag with an accommodating region arranged on the roof pillar and the A-pillar, the lower edge of the airbag has to be at least as long as the upper window cord in order to enable it to be folded into the accommodating region.

The consequence of such an excessive length in the conventional airbag is an undesirably high consumption of material. An excessive length of the lower edge of the airbag has a further substantial disadvantage. Specifically, the excessive airbag material results in the conventional airbag being very flexible or without "inner tension" in the region of its lower edge, thereby inhibiting the ability of the lower region of the airbag to absorb transverse forces in the event of an accident. Moreover, the lower region of the conventional airbag may even pivot out of the side window. To prevent such an occurrence, the single-part airbag would have to be anchored to the vehicle body in the region of the lower airbag edge, i.e., in the vicinity of the lower window margin.

In the case of the airbag according to the invention, these conventional problems (i.e., the unnecessary consumption of material and the requirement for the airbag to be anchored to the vehicle body) do not occur because the airbag according to the invention is segmented into at least two partial airbags. This segmentation enables one partial airbag to be matched, for example, to the length of the window upper edge (or of the roof strut) and the other partial airbag to be matched to the length of the front window side edge (or A-pillar), thereby rendering it superfluous to cut the airbag material to the excessive size of the conventional airbag.

A further substantial advantage of the invention is that the multipart airbag has, owing to the tensioning device connecting the partial airbags, virtually the same inner stability and tension as in a single-part airbag. This is because, owing to the tensioning device, the partial airbags cannot move with respect to one another or only insubstantially relative to one another, with the result that an anchoring of the airbag on the vehicle body is not absolutely necessary.

The airbag according to the invention, owing to its segmentation into partial airbags in "problem zones," is more material-saving than a single-part airbag, without a loss of inner stability and tension occurring and without a further anchorage being required.

In a particularly simple and, therefore, advantageous manner, the tensioning device can be formed by means of a tensioning cable. A first end of the cable may be fastened to the airbag in the connecting region between the two partial airbags whereas the second end of the cable may be fastened to an end, which is away from the connecting region, of one of the two partial airbags. Further, the other partial airbag may be indirectly or directly connected to the tensioning cable. In this configuration of the airbag according to the invention, the tensioning device may be formed essentially by a single tensioning cable on one of the two partial airbags.

In this case, the fastening of the tensioning cable to the other partial airbag may be formed by a guide through which the tensioning cable is pulled. A guide of this type can be formed in a particularly simple and, therefore, advantageous manner by a gastight opening in the other partial airbag.

As an alternative, the guide can also be formed in the other partial airbag by a loop that is fastened directly or indirectly to the other partial airbag.

As previously mentioned, the airbag according to the invention can advantageously be used in "problem zones" of the motor vehicle. As problem zones are, for example, the front and rear pillars of the motor vehicle, it is regarded as advantageous if the airbag is a head side airbag that is used in the region of the A-pillar and/or the C-pillar (or D-pillar).

In the case of a head side airbag, the one partial airbag may be fastened (directly or indirectly), in the uninflated state, in the region of the front or rear vehicle pillar and the other partial airbag may be fastened in the region of the roof strut of the motor vehicle, to achieve an optimum covering of the side windows or of the entire side of the vehicle with the airbag, thereby achieving an optimum protection for a vehicle passenger. The one partial airbag may extend, in the inflated state, essentially parallel along the front (or rear) vehicle pillar and the other partial airbag may extend essentially vertically downward from the roof strut.

To achieve a covering of the entire side of the vehicle, the airbag may have at least three partial airbags. A first partial airbag may be fastened in the region of the front vehicle pillar. A second partial airbag may be fastened in the region of the roof strut of the motor vehicle. And, a third partial airbag may be fastened in the region of the rear vehicle pillar. In this case, both the front "problem zone," which is arranged in the region of the A-pillar, and also the rear "problem zone," which is arranged in the region of the C-pillar, of the motor vehicle are covered by a single, three-part airbag.

In the case of an airbag having three partial airbags, there may be at least two tensioning devices. A first tensioning device may be in the front motor vehicle region and may secure the first and second partial airbags to each other. A second tensioning device may secure the second and the third partial airbags to each other. With the aid of the two tensioning devices, an optimum connection of the three partial airbags to one another and, therefore, an optimum securing and positioning of the partial airbags may be achieved.

A covering of the entire side of the vehicle can also be achieved if the airbag has two partial airbags that are secured to each other by a tensioning device in the central region of the airbag. The central region of the airbag may be arranged in the region of a central vehicle pillar, in particular the B-pillar, of the motor vehicle. If the tensioning device is situated in the region of an upper belt deflection of the motor vehicle, then it can be ensured in a simple and, therefore, advantageous manner that the belt device, in particular the upper belt deflection, does not obstruct the deployment of the airbag in the event of an accident.

The tensioning device(s) may be arranged at points of the airbag at which a protection potential does not have to be provided.

As a protective airbag, which is filled with gas and which may effectively prevent body parts from being hurled out of (or objects from falling out of) a side window of the motor vehicle, is not provided in the region of the tensioning devices, it may be regarded as advantageous if the airbag has a fabric sail in the region of at least one of the tensioning devices. The fabric sail may be intended to cover an opening (i.e., a "gap in protection") formed by the associated tensioning device in the airbag region. The fabric sail may be essentially triangular and/or anchored by the associated tensioning device. In addition, it may be regarded as advantageous if the airbag has further fabric sails. The further fabric sails may be arranged at gas fillings points at which the protection of the vehicle passenger is not required and only a shielding of the window region is to take place, for example, to avoid body parts from emerging from or being hurled out of the motor vehicle.

In addition, the airbag may have supporting elements on at least one window lower edge of the side windows of the motor vehicle, thereby preventing the airbag from being deflected into the side window region in the event of an accident.

As the upper region of the window cords does not necessarily have to be covered in an accident, the window cords may remain at least partially open or airbag-free for reasons of saving on material and for reasons of better anchoring of the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a plan view that shows a first exemplary embodiment of an airbag according to the invention in the uninflated state before installation in a motor vehicle;

FIG. 2 is a plan view that shows the airbag of FIG. 1 after installation in the motor vehicle and in a partially inflated state;

FIG. 3 is a plan view that shows the airbag of FIGS. 1 and 2 in a completely inflated state;

FIG. 4 is a plan view that shows a second exemplary embodiment of an airbag according to the invention before the airbag is folded;

FIG. 5 is a plan view that shows the airbag of FIG. 4 in a folded state before installation in the motor vehicle;

FIG. 6 is a plan view that shows the airbag of FIGS. 4 and 5 installed in the motor vehicle;

FIG. 7 is a plan view that shows the airbag of FIG. 6 in an inflated state;

FIG. 8 is a plan view that shows a third exemplary embodiment of an airbag according to the invention with a fabric sail before the airbag is folded;

FIG. 9 is a plan view that shows the airbag of FIG. 8 installed in the motor vehicle;

FIG. 10 is a plan view that shows the airbag of FIG. 9 in a deployed state; and

DETAILED DESCRIPTION

Figure 11:
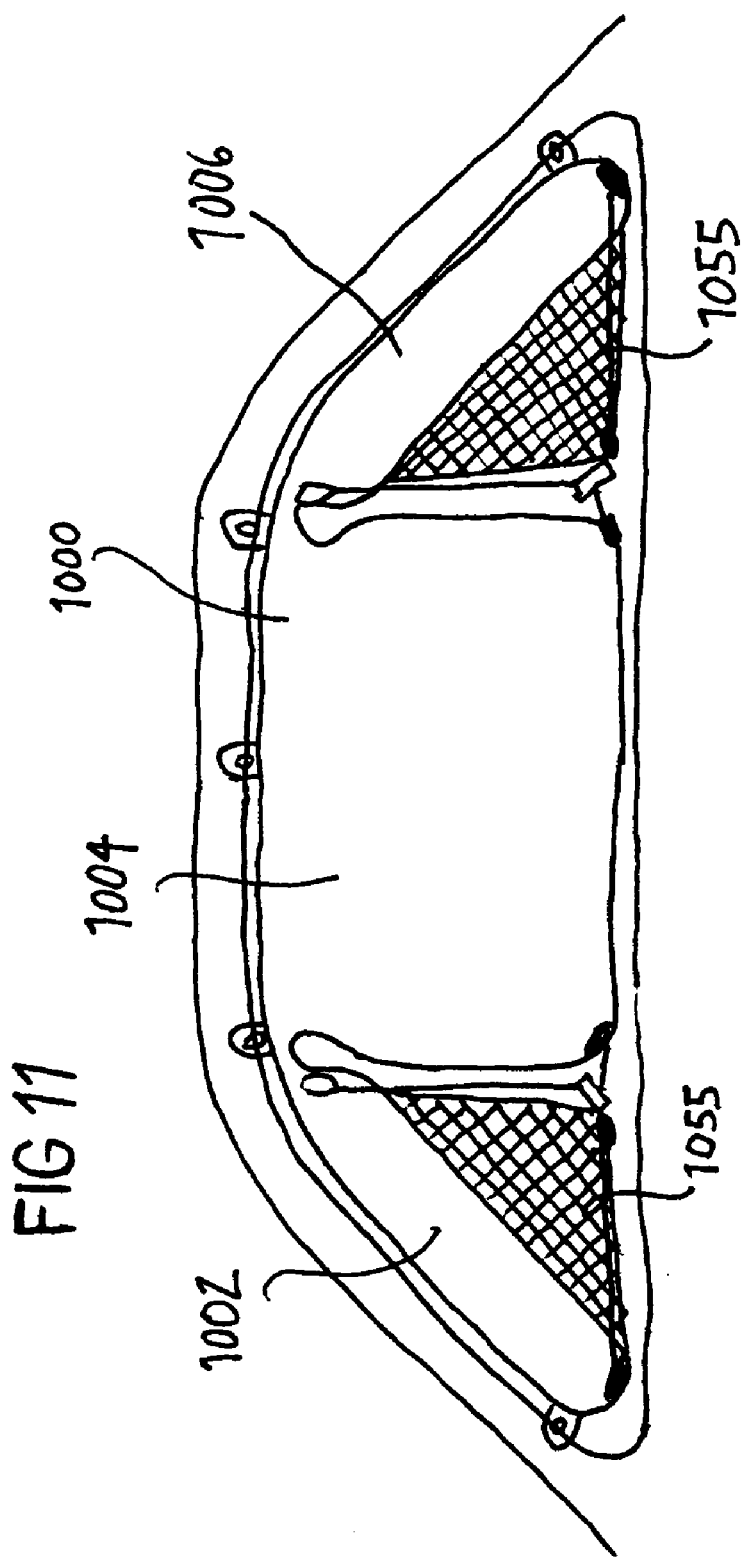
FIG. 11 is a schematic plan view that shows an airbag embodiment that is formed of three partial airbag sections and that includes a plurality of sails.

Embodiments of the present invention will be described with reference to the drawings. Like numbers are used throughout the drawings to refer to the same or similar parts and in each of the embodiments of the invention hereafter described.

FIG. 1 shows an airbag 10 (head side airbag) in the uninflated state. The airbag 10 has a partial airbag 20 (first partial airbag) and another partial airbag 30 (second partial airbag). The two partial airbags 20 and 30 are connected to each other in a connecting region 40 and are connected in terms of airflow.

A tensioning cable 50 is fastened to the first partial airbag 20. A first cable end 60 of the tensioning cable 50 is, for example, sewn or bonded to the airbag 10 in the connecting region 40 between the two partial airbags 20 and 30. The other (second) cable end 70 of the tensioning cable 50 is fastened to the end of the first partial airbag 20 that is away from the connecting region 40.

The tensioning cable 50 is pulled through a loop 80 that is connected to the second partial airbag 30 by means of a connecting cable 90. The connecting cable 90 is attached to the end of the second partial airbag 30 that is adjacent the connecting region (i.e., the end that faces away from the connecting region 40).

It can be seen in FIG. 1 that the second partial airbag 30 is partially folded. The arrows 100 indicate that the second partial airbag 30 has been folded, for example in zigzags with a partial airbag package 110 being formed. The airbag 10 is equipped with fastening loops 120a, 120b, 120c with which the airbag can be fastened to the vehicle body.

FIG. 2 shows the airbag 10 according to FIG. 1 installed in a motor vehicle. The reference number 200 indicates the front side window of the motor vehicle. The window pane 200 has an upper window cord that has a curved profile and that is composed of: (a) the window upper edge 220, which is adjacent to the upper roof strut 210; and (b) the front window side edge 240, which is adjacent to the A-pillar 230. The upper window cord is adjacent to the lower window lower edge 250, which runs essentially horizontally.

It can also be seen in FIG. 2 that the window cord is significantly longer than the window lower edge 250. If it were now to be attempted to accommodate a conventional single-part airbag in an accommodating space (i.e., an airbag module or accommodating container or tube) in the region of the roof strut 210 and the A-pillar 230, then the lower edge of the airbag would have to be significantly longer than the window lower edge 250. Otherwise, the airbag lower edge would be too short. In the case of a conventional single-part airbag, to enable the airbag be folded into the accommodating space, the lower edge of the airbag has to have a significant excessive length and be at least as long as the length of the window cord. As previously explained, the lower edge of the airbag would have to be tightened, e.g., by anchoring to the vehicle body, to achieve the required inner stability and tension of the airbag.

In the case of the exemplary embodiment according to FIG. 2, this problem is solved in a different manner. Specifically, the problem of the conventional airbag is solved by the airbag 10 being segmented into the two partial airbags 20 and 30. In this case, the first partial airbag 20 is fastened virtually along the entire A-pillar 230 directly to the vehicle body, to be precise by means of the two fastening loops 120b and 120c. The second partial airbag 30 is fitted with its upper edge directly to the roof strut 210 by means of the two fastening loops 120a and 120b. Of course, it is also possible for more than three fastening loops to be used for fastening the airbag 10.

FIG. 2 illustrates the first partial airbag 20 in the already inflated state and the second partial airbag 30 in the not yet inflated state. Arrows 300 indicate the inflation direction of the second partial airbag 30 or of the partial airbag package 110. For example, the airbag 10 can be inflated in such a manner that the first partial airbag 20 is essentially inflated (deployed) first and the second partial airbag 30 is subsequently inflated (deployed).

During the inflation of the partial airbag package 110, the loop 80 moves downward along the tensioning cable 50 and, in the process, pulls the two partial airbags 20 and 30 toward each other, thereby securing the two partial airbags 20 and 30 to each other. The completely inflated airbag 10 is illustrated in the secured state in FIG. 3. It can be seen that the first partial airbag 20 is fastened in the region of the A-pillar 230 of the motor vehicle and is secured to the second partial airbag 30 by the tensioning cable 50. The second partial airbag 30 is connected, in the region of its upper end, to the roof strut 210 and, in the region of its lower end, is secured via the connecting cable 90 and the loop 80 to the tensioning cable 50 and the first partial airbag 20.

It can also be seen in FIG. 3 that an opening 255 is formed by the airbag 10 in the region of the tensioning cable 50 and the loop 80; this opening could be covered or closed, for example, by means of a fabric sail, as later described with respect to the third exemplary embodiment shown in FIGS. 8–10.

In summary, it can, therefore, be established that, owing to the segmentation of the airbag 10 into the two partial airbags 20 and 30, an optimum covering of the window pane 200 may be achieved with maximum anchoring of the airbag and with minimal requirement for airbag material. This is because an excessive length of the airbag 10 in the region of the lower window edge 250 is not required in the case of the airbag 10 as a result of the segmentation of the airbag 10 into the two partial airbags 20 and 30. In addition, owing to the inner tensioning device formed by the tensioning cable 50, the loop 80, and the connecting cable 90, the airbag 10 is essentially anchored in the region of the narrow airbag edge and is pulled in a manner such that it is resistant to bending.

For the sake of completeness, it should be mentioned that in addition to the region of the front A-pillar of the motor vehicle, the airbag can also be correspondingly segmented in the region of the rear pillar of the motor vehicle (C/D-pillar). Such an airbag 1000, an example of which is shown in FIG. 11, can have three partial airbags, 1002, 1004, 1006, of which one is assigned to the front A-pillar, a second is assigned to the rear C-pillar, and a third is assigned to the roof strut. The partial airbags may then be connected to one another by corresponding tensioning devices.

Furthermore, the airbag 10 according to FIGS. 1 to 3 may also be fastened to the vehicle body by further tensioning devices. Tensioning devices for securing an airbag to the vehicle body are described, for example, in previously discussed DE 101 29 581 A1. Instead of directly fastening of the airbag 10 to the roof strut 210 and/or to the A-pillar 230, there may also be an indirect fastening, for example by means of the securing devices of the vehicle body that are described in DE 101 29 581 A1.

FIGS. 4 to 7 illustrate a second exemplary embodiment of an airbag according to the invention.

In FIG. 4, the airbag 400 can be seen before being folded up. The airbag 400 has two partial airbags 410 and 420 that are secured to each other by a tensioning device in a central region of the airbag 400. The tensioning device is formed by a tensioning cable 430, which is attached to the second partial airbag 420, and a sliding loop 440, which is attached to the first partial airbag 410. In the illustration according to FIG. 4, the sliding loop 440 is still "open," so that it can be attached to the tensioning cable 430 in a sliding manner.

The reference number 445 indicates folding lines along which the airbag 400 is folded in zigzags. In addition, the airbag 400 has fastening loops 450a, 450b and 450c with which the airbag 400 can be fastened to the vehicle body.

FIG. 5 shows the airbag 400 folded in zigzags. It can be seen that the sliding loop 440 is fitted into the tensioning cable 430 or is fastened in a sliding manner thereon.

FIG. 6 shows the airbag 400 during the installation in the motor vehicle. The fastening loop 450b is fastened to the roof strut 510 in the region of the B-pillar 500 of the motor vehicle. The fastening loop 450c is attached to the front A-pillar 520 and the fastening loop 450a is attached to the rear C-pillar 530. The airbag 400 is accommodated in an airbag module 540, which has a curved profile and which extends from the C-pillar 530 to the A-pillar 520.

FIG. 7 shows the airbag 400 the deployed state. It can be seen that the anchoring device formed by the tensioning cable 430 and the loop 440 is situated in the region of the B-pillar 500, specifically in the region of the upper belt deflection 550 of the seat belt.

The second partial airbag 420 covers the front side window 560 and the first partial airbag 410 covers the rear side window 570. However, the covering is not complete but rather is restricted to the regions in which the vehicle passengers have to be protected. In the region of the rear window cord 600 and in the region of the front window cord 610 there are openings 620 and 630 (i.e., areas in which there is no airbag covering). There is also a gap that remains free or "open" between the lower edges 660 and 670 of the two side windows 560 and 570 and the lower edge of the two partial airbags 410 and 420.

FIGS. 8 to 10 illustrate a third exemplary embodiment of an airbag 800 according to the invention.

FIG. 8 shows the airbag 800 before it is folded. The airbag 800 has fastening loops 810a, 810b and 810c for fastening the airbag in or on the motor vehicle. A tensioning cable 820 is attached to a first partial airbag 830 and a sliding loop 840 is attached to a second partial airbag 850. The first partial airbag 830 is adjoined by a fabric sail 855 that is not filled with gas when the airbag 800 is inflated. As is apparent further below in conjunction with FIG. 10, the fabric sail 855 is intended to prevent body parts and/or objects from being hurled out of a side window 900 of the motor vehicle in the event of an accident.

FIG. 9 shows the airbag 800 installed in the motor vehicle. The fastening loop 810a is fastened to the roof strut 870 in the region of the B-pillar 860 of the motor vehicle. The fastening loop 810b is attached in the transition region from the roof strut to the front A-pillar 880 and the fastening loop 810c is attached to the front A-pillar 880. The airbag 800 is accommodated in an airbag module that has a curved profile and that extends from the B-pillar 860 to the A-pillar 880.

The sliding loop 840 is fitted into the tensioning cable 820 or is fastened in a sliding manner thereon. The fabric sail 855 is fastened to the tensioning cable 820 at a fastening point 890. This fastening point 890 may also be designed in a sliding manner.

FIG. 10 shows the airbag 800 in the deployed state. It can be seen that the anchoring device, which is formed by the tensioning cable 820 and the loop 840, pulls the two partial airbags 830 and 850 together, thereby securing them to each other. In the process, the fabric sail 855 is likewise tensioned so that it brings about a covering or a shielding of the side window 900. As a result, body parts, objects etc. cannot be readily hurled out of the side window 900 in the event of an accident. On account of the fabric sail 855, no significant window 255 of the type previously described with respect to the first exemplary embodiment is formed. Of course, additional sails may be provided. For example, the airbag 1000 shown in FIG. 11 may include a plurality of sails 1055, two of which are shown.

Furthermore, it is also possible to use an eye, a ring or the like instead of a sliding loop 840. However, the friction between the eye, the ring etc. and the tensioning cable 820 should be as small as possible. The same applies to the first and the second exemplary embodiments that were previously discussed with respect to FIGS. 1–7.

The priority application DE 103 06 343.9 filed Feb. 10, 2003 is incorporated by reference herein.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention. The scope of the present invention is to be defined as set forth in the following claims.

The invention claimed is:

1. An airbag for a passenger protection device, the airbag comprising:
   at least two partial airbags that are connected to each other in terms of airflow; and
   at least one tensioning device that is configured to pull the at least two partial airbags toward each other and to secure the at least two partial airbags to each other,
   wherein the tensioning device at least one has a tensioning cable,
   wherein a first end of the cable is fastened to the airbag in a connecting region between the two partial airbags,
   wherein a second end of the cable is fastened to an end, which is away from the connecting region, of a first of the two partial airbags, and
   wherein a second of the at least two partial airbags is indirectly or directly connected to the tensioning cable.

2. The airbag as claimed in claim 1, wherein the second partial airbag has a guide through which the tensioning cable is pulled.

3. The airbag as claimed in claim 2, wherein the guide is formed by a gastight opening in the second partial airbag.

4. The airbag as claimed in claim 1, wherein the guide is formed by a loop that is fastened to the second partial airbag.

5. The airbag as claimed in claim 2, wherein the airbag is a head side airbag.

6. The airbag as claimed in claim 5, wherein the first partial airbag is configured to be fastened in a region between front and rear vehicle pillars, and wherein the second partial airbag is configured to be fastened in a region of a roof strut of the motor vehicle.

7. The airbag as claimed in claim 6, wherein the partial airbags are configured such that, when inflated, the first partial airbag to configured to extend along the front or rear vehicle pillar and the second partial airbag is configured to extend essentially vertically downward from the roof strut.

8. The airbag as claimed in claim 6, wherein the airbag has at least three partial airbags, of which a primary is configured to be fastened in the region of the front vehicle pillar, a secondary is configured to be fastened in the region of the roof strut, and a tertiary is configured to be fastened in the region of the rear vehicle pillar.

9. The airbag as claimed in claim 8, wherein there are two tensioning devices, wherein a first of the two tensioning devices is configured to be provided in a front motor vehicle region and is configured to secure the primary and secondary partial airbags to each other, and wherein a second of the two tensioning devices is configured to secure the secondary and tertiary partial airbags to each other.

10. The airbag as claimed in claim 1, wherein the tensioning device is provided in a central region of the airbag.

11. The airbag as claimed in claim 10, wherein the central region of the airbag is configured to be arranged in a region of a central vehicle pillar of the motor vehicle.

12. The airbag as claimed in claim 10, wherein the tensioning device is configured to be arranged in the region of an upper belt deflection of the motor vehicle.

13. An airbag for a passenger protection device, the airbag comprising:
   at least two partial airbags that are connected to each other in terms of airflow; and
   at least one tensioning device that is configured to pull the at least two partial airbags toward each other and to secure the at least two partial airbags to each other,
   wherein the airbag has a fabric sail in a region of each of the at least one tensioning device.

14. The airbag as claimed in claim 13, wherein each fabric sail covers an opening in the region of the airbag that is formed by the associated tensioning device.

15. The airbag as claimed in claim 14, wherein the airbag has at least one supporting element that is configured to be provided adjacent a lower edge of an associated side window, and wherein each of the at least one supporting element is configured to prevent the airbag from being deflected into regions of the associated side windows in the event of an accident.

16. The airbag as claimed claim 15, wherein window cords of the associated side windows of a motor vehicle are configured to remain partially open in the event of the accident.

17. The airbag as claimed in claim 13, wherein each fabric sail is essentially triangular.

18. The airbag as claimed in claim 13, wherein each fabric sail is configured to be anchored to one of the partial airbags by an associated tensioning device.

19. The airbag as claimed in claim 13, wherein the airbag has a plurality of fabric sails.

* * * * *